July 5, 1949.
J. E. McCLOSKEY
2,475,042
FASTENING MEANS
Filed March 14, 1945
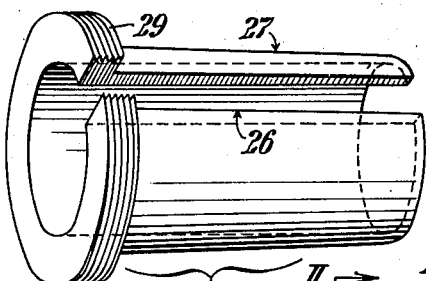
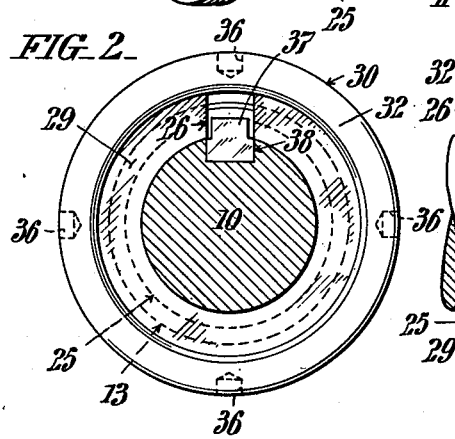
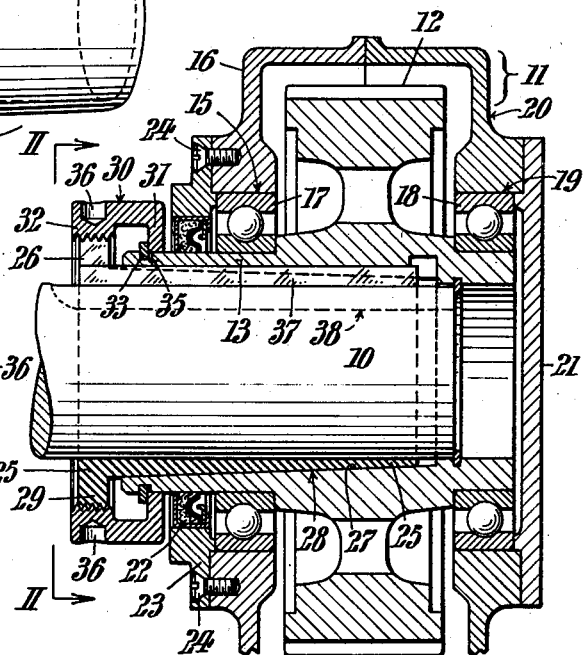
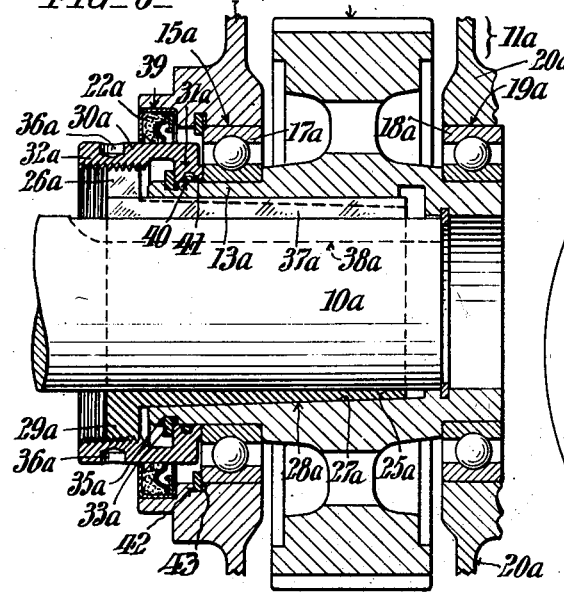
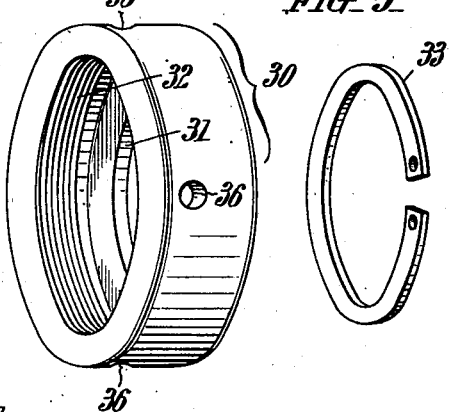
WITNESSES
Hubert Fuchs
Thomas W. Kerr, Jr.
INVENTOR:
Joseph Ellsworth McCloskey,
BY Paul & Paul
ATTORNEYS.

Patented July 5, 1949

2,475,042

UNITED STATES PATENT OFFICE 2,475,042

FASTENING MEANS

Joseph Ellsworth McCloskey, Philadelphia, Pa., assignor to The American Pulley Company, Philadelphia, Pa., a corporation of Pennsylvania Application March 14, 1945, Serial No. 582,677

6 Claims. (Cl. 287—53)

1

This invention relates to fastening means, and has reference more especially to fastening means useful in connecting speed reduction drive units to the actuating shafts of machines of different kinds.

The chief aim of my invention is to provide a simple and inexpensive and reliable fastening means by which drive wheels and other elements or speed reduction units may be readily and quickly applied to or removed from machine shafts to which rotary motion is to be transmitted.

A further aim of my invention is to secure the foregoing advantages in a fastening device which lends itself to incorporation in a wheel or a speed reduction unit in such way as to remain permanently assembled therewith.

Other objects and attendant advantages will appear from the following detailed description of the attached drawings, wherein Fig. 1 is a sectional view of a speed reduction drive unit whereof one of the gear wheels is secured to the shaft of a machine to be driven by a fastening means conveniently embodying my invention.

Fig. 2 is a cross section taken as indicated by the angled arrows II—II in Fig. 1.

Figs. 3, 4 and 5 are perspective views of the component parts of my improved fastening means; and Fig. 6 is a view like Fig. 1 showing a modification.

The speed reduction unit in part pictured in Fig. 1 is of a type intended to be applied directly to the end of the shaft 10 of a machine which is to be driven at reduced speed by an electric motor or other prime mover (not illustrated). As shown, the speed reduction unit has a housing 11 in which, among others, is enclosed a gear wheel 12, with one end of its hub 13 extending outward through an opening 15 in the side wall 16 of said housing. The hub of the gear wheel 12 is rotatably supported by ball bearings 17 and 18, the first of which is set into the opening 15 and the latter set into an orifice 19 in the other side wall 20 of the housing 11 and said orifice being closed by the bearing-retaining removable cover 21. Leakage of oil from the housing 11 is in this instance prevented by a sealing means 22 which contacts the wheel hub 13 circumferentially and which is forced into a bearing-retaining flange ring 23 secured by screws 24 to said housing.

The fastening means of my invention includes a wedge element in the form of a sleeve 25 (Fig. 3) which fits the shaft 10 and which is longitudinally split as at 26. The sleeve 25 is more-

2 over tapered as at 27 to engage into the inwardly tapering bore 28 of the wheel hub 13 (Fig. 1) and provided at its large or outer end with an externally threaded flange head 29. The fastening means further includes an annular nut collar 30 (Fig. 4) with an internal flange 31 at the inner end thereof bored to fit over the wheel hub 13 (Fig. 1), and a portion 32 at the outer end which is tapped to engage the threads of the flange head 29 of the sleeve 25. As shown, the internal flange 31 of the nut collar 30 normally abuts one side of a holding means formed by a split ring 33 (Fig. 3) sprung into a circumferential recess or groove 35 in the wheel hub 13. It is to be particularly noted that the threaded bore 32 of the nut collar 30 is of a diameter which will permit application of the ring 33 to the wheel hub 13 after placement of said collar and before insertion of the sleeve 25 incident to assembling the fastening means which thereafter remains attached to the wheel. By rotating the nut collar 30 in the proper direction, it will be seen that, through cooperation between the flange 31 and the holding means 33 and the draw of the threads 29 and 32, the sleeve 25 will be moved to the right in Fig. 1 relative to the shaft 10 and the wheel 12 with resultant binding of the assemblage to the shaft and retainment of the unit by the latter. On the other hand rotation of the nut collar 30 in the opposite direction will, through cooperation of the flange 31 and the flange ring 23, result in the partial withdrawal of the split sleeve 25 and release of the unit for removal from the shaft 10. In order that a spanner wrench may be employed in these operations, the nut collar 30 is provided at spaced circumferential intervals with socket recesses 36.

For greater security of the wheel 12 against rotation relative to the shaft 10, I preferably provide in addition, a key 37 which occupies a key seat 38 in said shaft and which projects into the slot 26 of the wedge sleeve 25 as shown in Fig. 2.

In the modification of Fig. 6, the packing element 22a is forced into a shouldered annular recess 39 around the opening 15a in the wall 16a of the housing 11a, and seals against the periphery of the nut collar 30a, oil leakage around the protruding end of the wheel hub 13a being prevented by packing 40 recessed into an internal groove 41 in the flange 31a of said collar. Retainment of the ball bearing 17a is in this instance effected by a split ring 42 recessed into an annular groove 43 internally of the opening 15a in the housing 11a. In all other respects the construction of the modification is identical with the first described form of the invention shown in Fig. 1. Accordingly in order to preclude the necessity for duplicate description, all the other elements of the modification having their counterparts in the first described embodiment are identified by the same reference numerals previously employed with addition in each instance of the letter "a" for the purposes of more ready distinction.

Having thus described my invention, I claim:

1. A means for fastening to a shaft, a wheel or the like having a hub with a tapered axial bore and a circumferential groove, said means including a longitudinally-split tapered wedge sleeve for placement about the shaft and engagement within the tapered bore in the wheel hub, said sleeve projecting beyond one end of the wheel hub and there having an externally-threaded circumferential flange; a nut collar having a tapped portion adjacent one end thereof for engaging the threaded flange of the sleeve, and an internal circumferential flange at the other end; and a split ring sprung into the groove of the hub for engagement by the inner side of the internal circumferential flange of the nut collar.

2. Means for fastening to a shaft a drive unit comprising a wheel having a hub with a tapered axial bore and a circumferential groove, and an enclosing housing with an apertured wall through which the wheel hub extends, said fastening means including a tapered longitudinally-split wedge sleeve for engaging within the tapered bore in the wheel hub and whereof the outer end is externally threaded and projects beyond the protruding end of the wheel hub; a circumferential holding means at the outer end of the wheel hub, and an annular nut collar with a tapped portion adjacent its outer end for engaging the threaded end of the sleeve and having its other end engaged over the circumferential holding means at the outer end of the wheel hub.

3. The invention according to claim 2, in which the wheel hub has a circumferential groove adjacent its outer end, in which the holding means is in the form of a split ring sprung into the groove, in which the sleeve has an externally threaded flange head at its outer end, and in which the tapped portion of the collar is of a diameter to permit placement of the split ring after the collar is applied to the wheel hub and before insertion of the sleeve.

4. The invention according to claim 2, wherein, upon being turned in the opposite direction, the nut collar reacts with the wall of the housing to withdraw the sleeve and thereby release the unit for removal from the shaft.

5. The invention according to claim 2, further including a key on the shaft for engaging into the split of the sleeve.

6. Means for fastening to a shaft, a drive unit comprising a wheel having a hub with a tapered axial bore and a circumferential groove, and an enclosing housing with an apertured wall through which the wheel hub extends, said fastening means including a longitudinally-split tapered sleeve for engaging within the tapered bore in the wheel hub and whereof the outer end is externally threaded and projects beyond the protruding end of the wheel hub; a circumferential holding means at the outer end of the wheel hub; an annular nut collar with a tapped portion adjacent one end for engaging the threaded end of the sleeve, and with an internal flange adjacent its other end for engaging the circumferential holding means at the outer end of the wheel hub when turned in one direction to tighten the sleeve; and a packing ring forming a seal around the collar to prevent escape of lubricant from within the housing.

JOSEPH ELLSWORTH McCLOSKEY.

REFERENCES CITED

The following references are of record in the file of this patent:

UNITED STATES PATENTS

| Number | Name | Date |
|---|---|---|
| 308,639 | Stevens | Dec. 2, 1884 |
| 582,481 | Nolan | May 11, 1897 |
| 738,445 | Hoffmann | Sept. 8, 1903 |
| 1,009,729 | Ekeberg et al. | Nov. 28, 1911 |
| 1,046,937 | Ash | Dec. 10, 1912 |
| 1,460,768 | Royce | July 3, 1923 |
| 1,871,092 | Smith | Aug. 9, 1932 |
| 2,133,102 | Kuhns | Oct. 11, 1938 |
| 2,381,697 | Shepard | Aug. 7, 1945 |

FOREIGN PATENTS

| Number | Country | Date |
|---|---|---|
| 497,366 | Great Britain | Dec. 19, 1938 |